United States Patent Office 2,965,541
Patented Dec. 20, 1960

2,965,541

17α-ACETOXYPROGESTERONE COMPOSITIONS FOR ORAL USE AND METHODS OF USING SAME

William W. Byrnes, Alamo Township, Allegan County, Mich., assignor to The Upjohn Company, Kalamazoo, Mich., a corporation of Delaware No Drawing. Filed June 22, 1959, Ser. No. 821,680

22 Claims. (Cl. 167—55)

This invention relates to oral hormonal therapeutic compositions. More particularly it relates to compositions for oral use containing 17α-acetoxyprogesterone, which compositions possess progestational or a progesterone-like effect in humans, animals and birds. It relates further to methods for their preparation, and to methods for their administration.

Progestrone, the active principle of the corpus luteum, is widely used in medicine for its progestational activity. Other related compounds are also known to possess progestational activity and have found limited clinical use. Most, however, including progesterone, exhibit little or no activity when administered orally. As a consequence they must be administered parenterally, a distinct disadvantage in most instances.

This invention has among its objects the provision of progestational compositions which are effective when administered orally, thus simplifying greatly the treatment of patients who are typically in a state of unusual sensitiveness and metal agitation and often exhibit exaggerated reluctance to parenteral treatment. It also has as an object the provision of compositions containing 17α-acetoxyprogesterone having progesterone-like effect for use in veterinary medicine, as for example, in controlling ovulation in animals, such as livestock and dogs, and in controlling moulting in poultry. Said control is advantageous in fixing the moulting period of poultry, for example, to attain uniformity of moulting in a flock and uniformity of laying when the control is removed. Likewise, the control can be exercised in swine and cattle to attain uniform estrus in a number of these animals for simultaneous insemination. In the case of bitches, the control can be exercised to obviate the surgical intervention known as spaying, without preventing subsequent successful breeding of the bitch.

It has a further object to provide such compositions in convenient, precise dosages in conventional unit dosage types which may be easily varied or alternated with placebos for diagnostic obervational purposes. Another object of the invention is to provide oral compositions which afford increased duration of effectiveness or delayed activity of a type not possible or at best inconvenient in the case of the injection method of treatment. Still another object is to provide a novel method for treating human patients to effect progestational response and thus to treat organic disorders.

A definite balance exists between the ovarian hormones (one having the characteristic function of the corpus luteum, progestrone, i.e., progestational, and the other that of estradiol) and the pituitary gonadotropic hormones. This balance establishes the normal menstrual cycle in humans and estrus in animals. The balance may be destroyed by insufficient progestational activity which is essential for development of a premenstrual endometrium, maintenance of pregnancy, breast growth, and inhibition of ovulation during pregnancy. For example, failure of normal production of progesterone by the corpus luteum or the placenta may be regarded as one of the reasons for abortion. Dysmenorrhea is frequently relieved by the administration of progestational substances such as progesterone. Oral administration of progestrone has much to be desired, however, since it is rapidly converted in the liver to the inactive substance pregnanediol, which is excreted in the urine. Subcutaneous injection, beside having the undesirable effects previously noted, may result in sensitization to the oil or other suspending agent in which it is prepared for injection. An object of the invention therefore is to facilitate the administration of progestational substances.

A further object of the invention is to provide compositions useful in the administration of coactive hormonal substances. Owing to its progesterone-like effects, the ester of this invention finds application in "cyclic" therapy, where estrogenic and progestational hormones are supplied together or in succession so as to favor reestablishment of normal endometrium-ovary-anterior pituitary relationships in cases of menstrual disturbances. The invention also includes the simultaneous or successive use of androgens such as 17-methyltestosterone which finds use in many instances of dysmenorrhea, periodic intermenstrual pain, premenstrual tension, and the like.

The foregoing object of the adminstration of coactive hormone substances is achieved by intermixing selected coactives with 17α-acetoxyprogesterone, particularly in dosage unit form. In the latter, successive action is conveniently achieved through the use of laminated pills or tablets in which the specific hormones and specific succession of effects may be varied by proper selection of core and enveloping layers of the laminated product. The use of enteric envelopes as a dosage coating and/or between lawers also provides means for controlling the time and the biologic interval between successive effects.

Among the estrogenic substances that are suitable as coactives are natural estrogenic substances (consisting of a mixture of estrone, equilin, equilenin, and which may include small amounts of estradiol), estradiol, estriol, ethinyl estradiol, benzestrol, dienestrol, diethylstilbestrol, hexestrol, promethestrol, and the like. Androgenic substances which are suitable are 17-methyltestosterone, methylandrostenediol, and the like.

The selection of the coactive hormone for use with 17α-acetoxyprogesterone is naturally dictated by the particular disorder encountered. However, specific combinations and formulations are given subsequently herein in order to illustrate the invention, it being understood that the particular coactive or combination of coactives may be varied over a wide range in kind and proportion.

This invention is based in part upon the discovery that the acetate of 17α-hydroxyprogesterone possesses relatively high oral activity. The discovery is surprising in view of the usual lack of oral activity of the class of gonadal hormones, and especially since the parent compound is inactive orally or parenterally.

The oral activity of the ester of this invention is unique in yet another respect. Normally esterification may alter the solubility of a steroid and, therefore, render it more or less effective, or decrease or prolong its period of effectiveness, but the biological activity is qualitatively essentially the same as that of the unesterified steroid in question. For example, the propionate of testosterone, the acetates of cortisone and hydrocortisone, and the benzoate of estradiol are quantitatively but not qualitatively different from the corresponding parent steroids. The ester of this invention is hence unique in exhibiting unexpected activity in an unexpected manner, i.e., when administered orally, for via this route of administration, 17α-hydroxyprogesterone is inactive, as previously stated.

In addition to the foregoing properties, oral compositions containing the 17α-hydroxyprogesterone ester do not exhibit the undesired side effects of progesterone or ethisterone. For example, at one milligram and 2.5 milligrams (subcutaneous) in rats 17α-hydroxyprogesterone acetate is not androgenic, does not lead to prostatic hypertrophy as do the parent compound (17α-hydroxyprogesterone), progesterone, and 17-ethinyltestosterone. In addition it is much less uterotropic than 17-ethinyltestosterone when administered orally (2.0 milligrams in ovariectomized immature female rats). Given orally to castrated immature rats in doses of 2.5 milligrams, 17α-hydroxyprogesterone acetate does not cause prostrate hypertrophy while progesterone and 17-ethinyltestosterone cause marked prostrate hypertrophy.

The compound of this invention has the following structural formula:

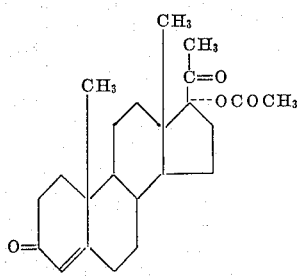

The ester may be prepared from 17α-hydroxyprogesterone by reaction with an acetyl esterifying compound. The following example illustrates a typical preparation:

*Preparation—17α-hydroxyprogesterone acetate*

One hundred grams (0.303 mole) of 17α-hydroxyprogesterone was dissolved in 1340 milliliters of acetic acid in a two liter round-bottom flask equipped with stirrer, thermometer, and nitrogen inlet and outlet. Solution was accelerated by stirring and warming to about fifty degrees centigrade. The solution was cooled to eighteen to twenty degrees, and 340 milliliters of acetic anhydride added. The system was flushed with nitrogen, and forty grams of p-toluenesulfonic acid added with vigorous stirring and cooling to below about 22 degrees centigrade. The reaction mixture was allowed to stand for a period of two hours and then poured into 6.4 liters of ice water and was kept at zero to five degrees for a period of about thirteen to fifteen hours, whereupon the crude acetate ester was filtered off and washed several times with water. The product weighed 101 percent of theory and melted at 217 to 245 degrees centigrade. It was purified by recrystallization from methanol to yield 76 grams of the purified 17α-hydroxyprogesterone 17-acetate, M.P. 243–48; $[\alpha]_{CHCl_3}+69$ degrees; $E_{241.5}=16{,}500{-}16{,}600$.

Utilizing the discovery of pronounced oral activity of 17α-acetoxyprogesterone, compositions are provided according to this invention which are suitable for oral administration of these as medicinals. The compound can be employed alone or in admixture with other coacting compounds. It can be associated with a carrier which can be a solid material or a liquid in which the compound is dissolved, dispersed or suspended. The solid compositions can take the form of tablets, powders, capsules, pills or the like, preferably in unit dosage forms for simple administration of precise dosages. The liquid compositions can take the form of solutions, emulsions, suspensions, syrups, or elixirs.

The compositions comprise the active material comprising the ester of this invention, with or without other coacting hormonal substances for effecting ancillary or auxiliary responses. For example, the active material also comprises estrogenic substances such as estradiol or diethylstilbestrol for enhancing the response in the treatment of menstrual difficulties. Other hormonals such as androgenic substances can be comprised in the composition, as may be analgesics such as aspirin, acetyl-p-aminophenol, salicylamide, phenacetin, and the like, sedatives such as phenobarbital, sodium pentobarbital, carbromal, acetyl carbromal, codeine, reserpine, and the like, anti-spasmodics such as belladonna, hyoscyamine, papaverine hydrochloride, and the like, and corticosteroids such as cortisone and hydrocortisone and their esters, prednisone, prednisolone, and the like.

The invention also includes compositions for admixture with alimentary products such as normal and dietary foods or animal and bird feeds, as well as the direct preparations of alimentary products containing the 17α-hydroxyprogesterone ester as an active ingredient. It includes compositions combining the ester with vitamins and vitamin concentrates as, for example, Vitamin A, Vitamin D, ascorbic acid, thiamine hydrochloride, nicotinamide, riboflavin, pyridoxine hydrochloride, pantothenic acid, folic acid, Vitamin $B_{12}$, Vitamin K, and the like, singly or in combination.

The 17α-hydroxyprogesterone acetate can be administered to the birds or animals in the drinking water, in a supplement for addition to the solid food, in a feed mix and in a carrier suitable for oral administration such as a tablet, capsule or suspension. The amount of the acetate to be administered varies from about 0.5 to about 10 mgs. for each kilo of body weight of the bird or animal.

In addition to the foregoing combinations of ingredients, the novel compositions of this invention can contain therapeutically effective quantities of antibiotics or antibacterial agents such as penicillin, tetracyclines, erythromycin, novobiocin, and the like, such compositions being especially useful as animal feed supplements and as ingredients in animal feed mixes.

For preparing solid compositions such as tablets, the compositions can include conventional tableting ingredients such as corn starch, lactose, talc, stearic acid, magnesium stearate, gums, and the like. Any compatible, edible, tableting material used in pharmaceutical practice can be employed. Alternatively, the compounds of this invention together with suitable adjuvants can be prepared in resorbable capsules, or they can be prepared in powder packet form for administration. Other solid forms which can be employed are enteric coated pills or tablets.

The tablets or pills of the novel composition can be laminated. This type of dosage form affords the advantage of prolonged or delayed action and/or predetermined successive actions of the medicinal. For example, the tablet or pill can comprise an inner dosage and an outer dosage, the latter in the form of an envelope over the former. The two dosages can be separated by an enteric layer. The enteric layer serves to resist the disintegration in the stomach and permits the inner dosage to be delayed or to pass intact into the duodenum. A large variety of materials can be used for enteric layers or coatings, suitable ones being polymeric acids or mixtures containing polymeric acids such as shellac, shellac-wool fat, shellac-castor oil, cetyl alcohol-shellac, cellulose acetate phthalate, shellac-ammonia, shellac-ammonia-alcohol, polycarboxylic acid esters of cellulose, cellulose phthalate, starch and amylose acetate phthalate, hydrolyzed styrene-maleic anhydride copolymer and the like.

Such enteric coated or laminated tablets can be prepared in a variety of forms. For example, they can take the form of a tablet containing the 17α-hydroxyprogesterone ester uniformly coated with a sufficient amount of enteric material to permit the tablet to remain intact until it leaves the stomach. A similarly coated tablet can in turn be coated with a dosage of the 17α-hydroxyprogesterone ester or other hormone substance of different level of activity or different response, thus to afford immediate as well as prolonged effect. In place of hormone substance, the outer coating can consist of an analgesic, sedative, or anti-spasmodic substance or combination.

The liquid forms comprise aqueous solutions, suitably flavored syrups, suspensions, flavored emulsions with edible oils such as cottonseed oil, sesame oil, coconut oil, peanut oil, and the like, elixirs and the like. Suitable suspending agents for aqueous suspensions of the esters of this invention include synthetic and natural gums such as tragacanth, acacia, alginates, dextran, sodium carboxymethylcellulose, polyvinylpyrrolidone, gelatin, and the like. A particularly useful suspending vehicle is prepared from a combination of sodium carboxymethylcellulose and polyvinylpyrrolidone. Another especially useful suspending vehicle contains polyethylene glycol.

The ester characterizing this invention has been found to produce surprising progestational responses in test animals as in the Corner-Allen test when administered orally. As previously stated, this is in striking contrast to the effect of 17α-hydroxyprogesterone, the parent compound, which is orally or parenterally progestationally inactive in assays such as the Corner-Allen and guinea-pig copulatory reflex assays. The parent compound, nevertheless, is many times more active than progesterone in the Hooker-Forbes test which determines local activity. The anomalous behavior of the parent compound is not easily explained. It appears, however, that its progress, oral or parenteral, through the system results in destruction of the molecule, and that the unprotected 17α-hydroxyl group probably represents the point of destructive attack. On the other hand, it is probable that the ester is resistant to hydrolysis by body enzymes, and the 17α-acetoxy group is protected against such attack. This mode of behavior would provide explanation for the advantageous behavior of the esters. Thus, the active principle providing the biological response may either be the ester, as such, or the 17α-hydroxyprogesterone regenerated in situ.

The compositions of this invention are preferably those prepared for administration in unit dosage form. In these the dosage can conveniently vary from five to fifty milligrams of the ester, though greater or less dosages are practical, the five milligrams or less dosages being convenient in instances where minimal response is indicated. In larger unit dosages up to 200 milligrams or more, it is convenient to prepare the composition in interseparable units, as for example, scored tablets.

The term "dosage unit form" as used in this specification refers to physically discrete units suitable for administration to birds and animal subjects, and human subjects, each unit containing a predetermined quantity of active material calculated to produce the desired therapeutic effect. The specifications for the novel dosage unit forms of this invention are dictated by and directly dependent upon the unique characteristics of the active material and the particular therapeutic effect to be achieved, as disclosed in detail in this specification, being features of the present invention. Examples of suitable oral dosage unit forms in accordance with this invention are tablets, capsules, pills, powder packets, wafers, catchets, pellets, teaspoonfuls, tablespoonfuls, and the like.

The following examples are illustrative of the process and products of the present invention, but are not to be construed as limiting.

Example 1

This example illustrates the relative oral activity of 17α-hydroxyprogesterone acetate and progesterone. The two compounds were placed in an aqueous dispersion of 0.5 percent tragacanth as diluent and administered in fifty milligram doses to ovariectomized estrus rabbits (Corner-Allen method). The results are as follows:

TABLE I

| No. of Rabbits | Treatment | Response |
| --- | --- | --- |
| 1 | 17α-hydroxyprogesterone acetate | ++++ or +++++ |
| 1 | progesterone | negative. |

Example 2

In another experiment the oral activity of 17α-hydroxyprogesterone acetate was compared with progesterone and 9(11)-dehydroprogesterone at a total dosage of 200 milligrams per animal (ovariectomized rabbits), again employing the Corner-Allen method of assay. In this experiment the compounds tested were suspended in an aqueous dispersion of sodium carboxymethylcellulose. The results are as follows:

TABLE II

| No. of Rabbits | Treatment | Response |
| --- | --- | --- |
| 1 | 9(11)-dehydroprogesterone | negative. |
| 1 | 17α-hydroxyprogesterone acetate | ++++ |
| 1 | progesterone | negative. |

Example 3

In another experiment, the oral activity of 17α-hydroxyprogesterone acetate in controlling estrus in bitches was determined. 17α-hydroxyprogesterone acetate was fed daily as a component in a pelleted feed mix to bitches over a period of nineteen weeks. The data are summarized in Table III.

TABLE III

| Group | No. of Bitches | Dosage | Cumulative Heat Periods |
| --- | --- | --- | --- |
| I | 10 | 10 mg./kilo/day | 0 |
| II | 9 | 2.5 mg./kilo/day | 0 |
| III | 10 | 0.5 mg./kilo/day | 8 |
| IV | 10 | controls | 6 |

These data confirm the unexpected activity of 17α-hydroxyprogesterone acetate in controlling estrus in bitches. It is apparent that a dosage of about 0.5 mg./kilo/day is the minimum effective dose. Subsequent to the termination of the experimental feeding period, the bitches come into heat and can be bred successfully.

Example 4—Tablet

Ten thousand oral tablets, each containing fifteen milligrams of 17α-hydroxyprogesterone acetate, are prepared from the following types and amounts of materials:

17α-hydroxyprogesterone acetate _____ 5 oz. 128 grs.
Lactose U.S.P. _____ 5 lbs.

The finely powdered 17α-hydroxyprogesterone acetate and lactose are mixed well and granulated with syrup-starch paste. After the granules are dried, starch and calcium stearate are added and the final mixture is compressed into tablets. The tablets are assayed for potency and used clinically in functional uterine bleeding at a dose of two tablets daily.

Example 5—Tablet

Following the procedure of Example 4, five thousand oral tablets, each containing 150 milligrams of 17α-hydroxyprogesterone acetate, are prepared from the following types and amounts of materials:

17α-hydroxyprogesterone acetate ____ 1 lb. 10 oz. 202 grs.
Lactose U.S.P. _____ 1 lb. 10 oz. 202 grs.

Example 6—Tablet

Following the procedure of Example 4, five thousand oral tablets, each containing 50 milligrams of 17α-hydroxyprogesterone acetate, are prepared from the following types and amounts of materials:

17α-hydroxyprogesterone acetate ____ 8 oz. 358 grs.
Lactose U.S.P. _____ 2 lb. 12 oz. 46 grs.

The tablets are useful clinically with good results in the treatment of irregular menstrual bleeding.

Example 7—Aqueous suspension

An aqueous suspension for oral use, containing in each five milliliters (approximately one teaspoonful) 25 milligrams of 17α-hydroxyprogesterone acetate, is prepared from the following types and amounts of materials:

| | | |
|---|---|---|
| 17α-hydroxyprogesterone acetate, micronized | gm | 5 |
| Citric acid, U.S.P. | gm | 2 |
| Benzoic acid, U.S.P. | gm | 1 |
| Methylparaben, U.S.P. | gm | 2 |
| Propylparaben, U.S.P. | gm | 0.5 |
| Glycerine, U.S.P. | ml | 150 |
| Tragacanth powder, U.S.P. | gm | 7.5 |
| Essential oil flavor concentrate | ml | 0.2 |
| Sucrose, U.S.P. | gm | 400 |

Deionized water to make 1,000 ml.

The citric acid is dissolved in 500 milliliters of water. The benzoic acid and parabens are added to the glycerine in a separate container, followed by the finely powdered 17α-hydroxyprogesterone acetate, tragacanth and flavors in the order named. This is mixed until a uniform suspension is achieved and then added to the aqueous solution with rapid stirring. Finally, the sugar is added and the whole mixed thoroughly followed by processing through a colloid mill. Sufficient water is employed to rinse the colloid mill and the rinsings used to bring the final volume to 100 milliliters. The suspension is assayed for potency and used clinically.

Example 8—Aqueous suspension

An aqueous suspension for oral use, containing in each five milliliters (approximately one teaspoonful) one milligram of estrogenic crystallizate and ten milligrams of 17α-hydroxyprogesterone acetate, is prepared from the following types and amounts of materials:

| | | |
|---|---|---|
| 17α-hydroxyprogesterone acetate, micronized | gm | 2 |
| Estrogenic crystallizate [1] | gm | 0.2 |
| Polyethylene glycol 4000, U.S.P. | gm | 60 |
| Sodium carboxymethylcellulose (low viscosity) | gm | 5 |
| Benzoic acid, U.S.P. | gm | 1 |
| Methylparaben, U.S.P. | gm | 1 |
| Cocoa | gm | 50 |
| Soluble saccharin | gm | 1 |
| Sucrose, U.S.P. | gm | 700 |
| Essential oil flavor concentrate | ml | 0.1 |

Deionized water to make 1,000 ml.

[1] Naturally occurring equine estrogens consisting primarily of estrone, equilin and equilenin with possible trace of estradiol.

The suspension is assayed for potency and used clinically for menstrual disorders with unusually good results.

Example 9—Soft gelatin capsules

One-piece soft gelatin capsules for oral use, each containing two milligrams of diethylstilbestrol and ten milligrams of 17α-hydroxyprogesterone acetate, are prepared in the usual manner by first dispersing the finely powdered active ingredients in sufficient corn oil to render the combination capsulatable. The capsules are assayed for potency and used clinically for amenorrhea with unusually satisfactory results.

Example 10—Hard gelatin capsules

Two-piece hard gelatin capsules for oral use, each containing 300 milligrams of acetyl-p-aminophenol, 30 milligrams of caffeine and 15 milligrams of 17α-hydroxyprogesterone acetate, are prepared in the conventional manner by first mixing the finely powdered active materials with excipients (e.g., starch, talc, stearic acid, magnesium stearate) and then encapsulating. The capsules are assayed for potency and used clinically for dysmenorrhea with good results.

Example 11—Feed supplement

A dry feed supplement suitable for incorporating into the normal diet is prepared from the following types and amounts of materials:

PART I

| | |
|---|---|
| 17α-hydroxyprogesterone acetate | 2 lbs. |
| Liver protein | 64 lbs. |
| Whole liver powder | 60 lbs. |
| Fish meal | 200 lbs. |
| Terra alba | 24 lbs. |
| Dicalcium phosphate | 100 lbs. |
| Ferrous gluconate powder | 6 lbs. 8 oz. |

PART II

| | |
|---|---|
| Lecithin | 32 lbs. |
| Wheat germ oil | 11 lbs. 8 oz. |
| Brewer's yeast | 200 lbs. |

The Part I ingredients are mixed well together. The Part II wheat germ oil is mixed with the warmed lecithin and this mixture is added slowly to the brewer's yeast. The Part II mixture is then blended well with the Part I mixture to give the final product. Each 3.5 grams (approximately one teaspoonful) of the final mixture contains ten milligrams of the active ingredient, 17α-hydroxyprogesterone acetate. The proper amount of this supplement to be added to the animal food can be calculated from the weight of the animal, the required dosage of active ingredient, and the amount of food consumed per day. In Kirk's Index of Treatment in Small-Animal Practice, published in 1951 by The Williams and Wilkins Company, there is a table on page 713 of food requirements in dogs:

TABLE IV

Food maintenance requirements of mature dogs

| Body Weight (Kg.) | Grams of Food Per Animal Fresh Basis (70 Percent Moisture) Per Day |
|---|---|
| 1 | 118 |
| 2 | 195 |
| 3 | 262 |
| 4 | 323 |
| 5 | 380 |
| 6 | 433 |
| 7 | 487 |
| 8 | 537 |
| 9 | 583 |
| 10 | 630 |
| 20 | 1,040 |
| 30 | 1,410 |
| 40 | 1,740 |
| 50 | 2,043 |

Another table, Number V, is given on page 712 of the same publication:

TABLE V

The following table of approximate quantities of food per day, for maintenance of an adult animal in a wellnourished condition, is one which is considered fairly reliable as a general guide:

| | | |
|---|---|---|
| St. Bernards, Mastiffs, Great Danes | lbs | 2.5–4.5 |
| Collies, Retrievers, Alsatians and similar | lbs | 1.5–2.5 |
| Greyhounds | lbs | 1.8–2.5 |
| Airedales, Chows, Bulldogs and similar | lbs | .8–1.5 |
| Fox terriers, Welsh terriers, Scotties, etc. | ozs | 8–12 |
| Pugs, Poms, Pekingese | ozs | 4–8 |
| Cats | ozs | 4–8 |

From the above tables the amount of supplement to be added daily to the food can be calculated. For example, using Table I, to the 1740 grams of food per day for the 40 kilogram bitch, at a daily dosage of one milligram of active ingredient per kilogram of body weight, four teaspoonfuls of food supplement are used. Using Table II, to the approximately three pounds of food per day for the St. Bernard, at a total daily dosage of twenty milligrams of active ingredient, two teaspoonfuls of food supplement are added. The daily addition to the diet is continued as long as control of the fertility period is desired.

*Example 12—Feed supplement*

Following the procedure of Example 11, a satisfactory supplement for incorporating into the normal diet can be prepared by substituting four pounds of 17α-hydroxyprogesterone acetate for the two pounds of 17α-hydroxyprogesterone acetate. Each 3.5 grams of such a supplement contains twenty milligrams of the active ingredient. The amount of the supplement to be added daily to the normal bitch diet can again be calculated by reference to Tables I and II. Smaller amounts can be added to poultry mash to control the poultry moulting period.

*Example 13—Feed supplement containing vitamins*

Following the procedure of Example 11, a vitamin containing supplement is prepared by adding the following ingredients to the Part I formula:

| | | |
|---|---|---|
| Riboflavin | 3 oz. | 88 grs. |
| Pyridoxine hydrochloride | | 140 grs. |
| Thiamine mononitrate | 4 oz. | 350 grs. |
| Nicotinamide | | 3 lbs. |
| Vitamin A acetate | | 1 lb. |

The supplement is added daily to the food as long as control of the fertility period is desired.

*Example 14—Feed mix*

Ready-mixed feed, i.e., already containing the active ingredient, is prepared in the following manner:

| | |
|---|---|
| Commercial dog feed lbs. (fresh basis) | 100 |
| 17α-hydroxyprogesterone acetate mg | 800 |

The ester is worked into a portion of the feed by careful mixing and the mix is incorporated uniformly into the whole. Each pound of the finished preparation contains eight milligrams of the ester providing a total daily dose of 10 milligrams for a 10 kilo dog eating 1¼ lb. of the feed per day.

*Example 15—Feed supplement with tranqualizer*

Following the procedure of Example 11, a feed supplement containing a tranqualizer is prepared by adding 1 lb. of perphenazine to the Part I mixture of Example 10, without impairing the effectiveness of the supplement in controlling the fertility period.

*Example 16—Liquid preparation*

4000 mls. of a drop preparation adaptable for direct oral administration or for the addition of measured amounts of 17α-hydroxyprogesterone acetate to animal feed is prepared as follows:

| | | |
|---|---|---|
| Preservative | gm | 14 |
| Surfactant | gm | 3.6 |
| 17α-hydroxyprogesterone acetate, micronized | gm | 100 |
| Purified water, U.S.P., q.s. ad. | ml | 4,000 |

The preservative is added to 500 mls. of the water at about 55° C. The surfactant is added thereto followed by the micronized 17α-hydroxyprogesterone acetate. The whole is made up to volume with the balance of the water and passed through an homogenizer.

For the treatment of a 10 kilo dog, 10 drops are added daily to the feed to provide a daily dosage of approximately 10 mg. equivalent to 1 mg. per kilo of dog weight per day.

For the treatment of poultry lesser amounts are added to the feed mash depending on the size of the poultry.

*Example 17—Sealed, soft gelatin capsules*

1000 soft gelatin capsules, each containing 5000 milligrams of 17α-hydroxyprogesterone acetate, are prepared from the following types and amounts of ingredients:

| | |
|---|---|
| 17α-hydroxyprogesterone acetate | 5 gm. |
| Corn oil | q.s. |

The 17α-hydroxyprogesterone acetate is uniformly dispersed in the corn oil and the dispersion is encapsulated by the usual techniques. A daily dosage of one capsule is used to control the fertility period in larger animals such as cattle and swine.

*Example 18—Liquid preparation*

4000 mls. of a drop preparation adaptable for direct oral administration or for the addition of measured amounts of 17α-hydroxyprogesterone acetate to animal feed is prepared as follows:

| | | |
|---|---|---|
| Citric acid hydrate | gm | 8 |
| Benzoic acid | gm | 4 |
| Methylparaben | gm | 8 |
| Propylparaben | gm | 2 |
| Sorbitol solution N.F. | ml | 2,600 |
| Sodium lauryl sulfate | gm | 2 |
| Sorbitan trioleate | gm | 1.6 |
| Tragacanth | gm | 16 |
| Glycerin, U.S.P. | ml | 600 |
| 17α-hydroxyprogesterone acetate, micronized | gm | 100 |
| Purified water, U.S.P., q.s. ad. | ml | 4,000 |

The citric acid, benzoic acid, parabens and tragacanth are mixed as dry powders. The glycerin is added slowly with stirring. The temperature is raised to about 55° C. and 500 mls. of the water is added with stirring. The sodium lauryl sulfate and sorbitan trioleate are incorporated followed by the micronized 17α-hydroxyprogesterone acetate. The sorbitol solution is added, the whole made up to volume with the water and passed through an homogenizer.

For the treatment of a 10 kilo dog, 10 drops are added daily to the feed to provide a daily dosage of approximately 10 mg. equivalent to 1 mg. per kilo of dog weight per day.

For the treatment of poultry lesser amounts are added to the feed mash depending on the size of the poultry.

It is to be understood that the invention is not to be limited to the exact details of operation or exact compositions shown and described herein as obvious modifications and equivalents will be apparent to one skilled in the art, and the invention is therefore to be limited only by the scope of the appended claims.

This application is a continuation-in-part of my application Serial No. 555,725, filed December 27, 1955, and now abandoned.

What is claimed is:

1. The method of treating hormonal disturbances in the human being which comprises orally administering to a living human being a pharmaceutical composition containing from about five to about 200 milligrams of 17α-acetoxyprogesterone.

2. The method of treating hormonal disturbances in the human being which comprises orally administering to a living human being a unit dosage of a pharmaceutical composition containing from about five to about 200 milligrams of 17α-acetoxyprogesterone, said dosage unit being selected from the group consisting of tablets and capsules.

3. An oral composition in dosage unit form for treatment of hormonal disturbances comprising from about five to about 200 milligrams per dosage unit of 17α-acetoxy-progesterone and a solid pharmaceutical carrier.

4. An oral composition in dosage unit form for treatment of human menstural disturbances comprising from about five to about 200 miligrams per dosage unit of 17α-acetoxyprogresterone, an estrogenic material and a pharmaceutical diluent.

5. The composition of claim 4 in which the estrogenic material is diethylstilbestrol.

6. The composition of claim 4 in which the estrogenic material is estradiol.

7. An oral composition in dosage unit form for treatment of human hormonal disturbances comprising from about five to about 200 milligrams per dosage unit of 17α-acetoxyprogresterone, an androgenic material and a pharmaceutical diluent.

8. The composition of claim 7 in which the androgenic material is 17-methyltestosterone.

9. A laminated unit dosage for oral treatment of hormonal disorders comprising a central body comprising a pharmaceutical agent and at least one enveloping body comprising also a pharmaceutical agent, at least one of said pharmaceutical agents being from about five to about 200 milligrams of 17α-acetoxyprogesterone.

10. The structure of claim 9 in which bodies comprising said pharmaceutical agents are separated from each other by an enteric envelope.

11. A tablet for oral treatment of hormonal disorders comprising from about five to about 200 milligrams of 17α-acetoxyprogesterone and a pharmaceutical diluent.

12. An oral composition in dosage unit form for treatment of human hormonal disturbances comprising from about five to about 200 milligrams per dosage unit of 17α-acetoxyprogesterone, an analgesic material and a pharmaceutical diluent.

13. The composition of claim 12 in which the analgesic material is acetylsalicylic acid.

14. The method of effecting control of the fertility period in animals which comprises the oral administration to said animals of a composition containing from about 0.01 to about 5000 milligrams of 17α-hydroxyprogesterone acetate dispersed in a pharmaceutical carrier.

15. An animal feed mix effective in the control of the fertility period in animals comprising from about 0.01 to about 5000 milligrams of 17α-hydroxyprogesterone acetate and an animal feed carrier.

16. The method of effecting control of the fertility period in animals which comprises the oral administration to said animals of from about 0.5 to about 10 milligrams of 17α-hydroxyprogesterone acetate per kilo of body weight of said animals.

17. An animal feed mix effective in the control of the fertility period in animals comprising from about 0.004 to about 50 percent by weight of said mix of 17α-hydroxyprogesterone acetate.

18. The method of effecting control of the fertility period in animals which comprises mixing with the feed of said animals from about 0.01 to about 5000 milligrams of 17α-hydroxyprogesterone acetate.

19. A composition in dosage unit form for oral administration in the control of the fertility period in animals comprising per dosage unit from about 0.01 to about 5000 milligrams of 17α-hydroxyprogesterone acetate dispersed in a solid pharmaceutical carrier.

20. An aqueous composition for oral administration in the control of the fertility period in animals comprising about 2.5 to about 5 percent, weight/volume, of 17α-hydroxyprogesterone acetate, a preservative and a surfactant.

21. The method of effecting control of the moulting period in birds which comprises the oral administration to said birds of from about 0.5 to about 10 milligrams of 17α-hydroxyprogesterone acetate per kilo of body weight of said birds.

22. The method of inducing progestational effects in ovulating mammals which comprises the oral administration to said mammals of a composition containing from about 0.01 to about 5000 milligrams of 17α-hydroxyprogesterone acetate dispersed in a non-toxic, orally acceptable carrier.

References Cited in the file of this patent

UNITED STATES PATENTS 2,753,360    Kaspar _____ July 3, 1956